(12) United States Patent
Abe et al.

(10) Patent No.: US 10,335,910 B2
(45) Date of Patent: Jul. 2, 2019

(54) SEALING MEMBER FOR MACHINE TOOLS

(71) Applicant: Bando Chemical Industries, Ltd., Hyogo (JP)

(72) Inventors: Yuki Abe, Hyogo (JP); Nariaki Iwasaki, Hyogo (JP); Mitsuo Horiuchi, Hyogo (JP)

(73) Assignee: BANDO CHEMICAL INDUSTRIES, LTD., Hyogo (JP)

( * ) Notice: Subject to any disclaimer, the term of this patent is extended or adjusted under 35 U.S.C. 154(b) by 366 days.

(21) Appl. No.: 15/116,188

(22) PCT Filed: Jan. 29, 2015

(86) PCT No.: PCT/JP2015/052476
§ 371 (c)(1),
(2) Date: Aug. 2, 2016

(87) PCT Pub. No.: WO2015/119030
PCT Pub. Date: Aug. 13, 2015

(65) Prior Publication Data
US 2017/0008140 A1    Jan. 12, 2017

(30) Foreign Application Priority Data

Feb. 6, 2014 (JP) ................................ 2014-021277

(51) Int. Cl.
*F16J 15/32* (2016.01)
*B23Q 11/08* (2006.01)
*F16J 15/3204* (2016.01)

(52) U.S. Cl.
CPC ...... *B23Q 11/0825* (2013.01); *B23Q 11/0875* (2013.01); *F16J 15/3204* (2013.01)

(58) Field of Classification Search
CPC ... F16J 15/32; F16J 15/18; F16J 15/44; F01D 11/02
See application file for complete search history.

(56) References Cited

U.S. PATENT DOCUMENTS 3,429,356 A * 2/1969 Haschek ............ B23Q 11/0875
160/202
4,099,798 A * 7/1978 Steinmetz .......... B23Q 11/0875
15/236.01
(Continued)

FOREIGN PATENT DOCUMENTS

EP        1199133 A1     4/2002
JP     H02-085548 U     7/1990
(Continued)

OTHER PUBLICATIONS

Extended European Search issued in corresponding application No. EP15746826.5, dated Oct. 30, 2017, 7 pages.
English machine translation of JP 2008-264922 A in full text (obtained through the website of J-Plat-Pat).
(Continued)

*Primary Examiner* — Vishal A Patel
(74) *Attorney, Agent, or Firm* — Lewis Roca Rothgerber Christie LLP

(57) ABSTRACT

An object of the present invention is to provide a sealing member for machine tools which has excellent reliability because excellent sealability can be maintained for a long period of time and which can be manufactured efficiently at low cost. The sealing member for machine tools of the present invention includes a supporting member; a plate-shaped elastic member; and an adhesive layer which bonds the elastic member to the supporting member. The supporting member has a shape of a bent plate-like body, the elastic member is bonded to the supporting member via the adhesive layer laminated on a part of a front face of the elastic member so as to be curved along the bent shape of the supporting member, and a corner portion formed by a back face and one side face of the elastic member is assumed to be an edge portion in contact with an opposite material, and the one side face is formed by cutting.

4 Claims, 10 Drawing Sheets

(56) References Cited

U.S. PATENT DOCUMENTS

| | | | | |
|---|---|---|---|---|
| 4,822,059 | A * | 4/1989 | Shimasaki | F16J 15/3232 |
| | | | | 277/564 |
| 6,182,975 | B1 * | 2/2001 | Matsushima | B29C 45/0055 |
| | | | | 277/559 |
| 2006/0133903 | A1 * | 6/2006 | Shiraishi | B23B 39/161 |
| | | | | 408/199 |
| 2015/0042044 | A1 * | 2/2015 | Benedix | F16J 15/3228 |
| | | | | 277/407 |

FOREIGN PATENT DOCUMENTS

| | | |
|---|---|---|
| JP | H11-159627 A | 6/1999 |
| JP | 2000-308944 A | 11/2000 |
| JP | 2004-243513 | 9/2004 |
| JP | 2005-0246490 A | 9/2005 |
| JP | 2006-123126 A | 5/2006 |
| JP | 2008-264922 A | 11/2008 |

OTHER PUBLICATIONS

English machine translation of JP 2000-308944 A in full text (obtained through the website of J-Plat-Pat).
English machine translation of JP 2006-123126 A in full text (obtained through the website of J-Plat-Pat).
English machine Translation of JPY H06-045314 (Examined Publication of JPU H02-085548 A) in full text (obtained through the website of J-Plat-Pat).
English machine translation of JP H11-159627 A in full text (obtained through the website of J-Plat-Pat).

* cited by examiner

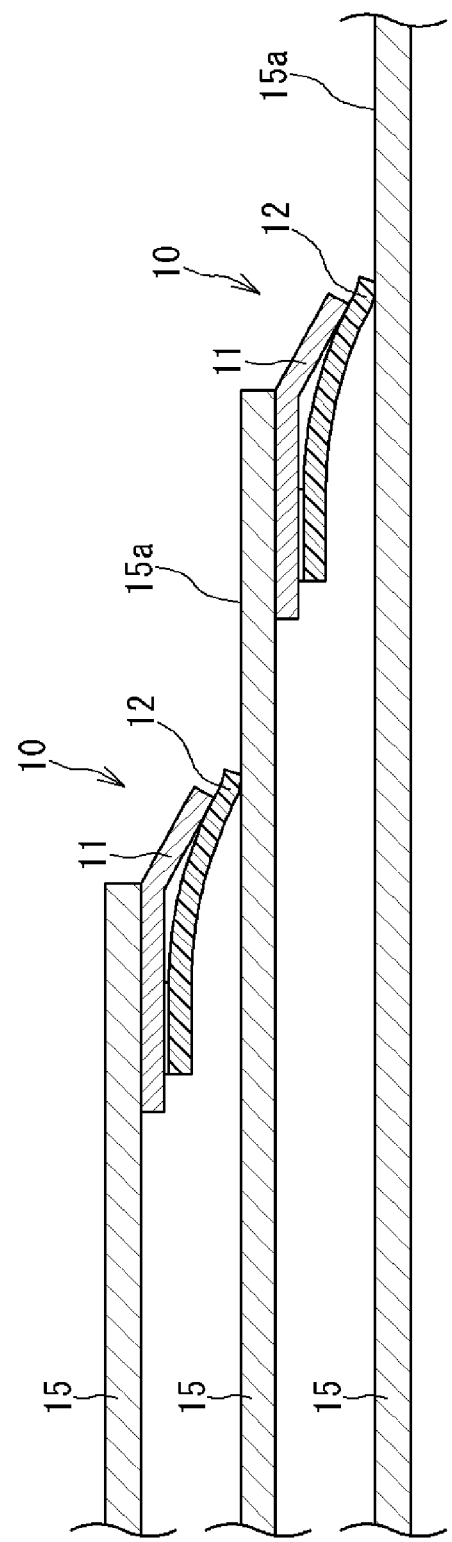

SEALING MEMBER FOR MACHINE TOOLS

CROSS-REFERENCE TO RELATED APPLICATIONS

The present application is a national phase application of International Application PCT/JP2015/052476, with an international filing date of Jan. 29, 2015, which claims the priority benefit of Japanese Application No. 2014-021277, filed Feb. 6, 2014, the contents of which are incorporated herein by reference in their entirety for all purposes.

TECHNICAL FIELD

The present invention relates to a sealing member for machine tools.

BACKGROUND ART

Machine tools such as a lathe and a miller are the most basic machinery generally used in the manufacturing industry. In these machine tools, various sealing members, for example, a slide seal, a telescopic seal, a covering seal, and a lip seal are used in order to protect a driving mechanism and the like from swarf, a coolant (cutting oil) or the like.

For example, the telescopic seal is a wiper member for use in a telescopic cover. The telescopic cover has a tube-shaped structure like a telescope in which a plurality of box-shaped covers of different sizes are arranged in different levels with a gap provided therebetween, the covers being configured to be coupled with each other via a coupling member such as a pantograph, and be stretchable as a whole along with, for example, shift of a tool of a machine tool. The telescopic seal is a wiper member for filling a clearance between covers, and is attached to an end portion of an outer cover so as to be in sliding contact with an outer surface of an inner cover, thereby preventing swarf or the like from entering the inside of the corner (inside of the telescopic cover).

As such a telescopic seal, there has been proposed, for example, a wiper 1 for machine tools as shown in FIG. 10. The wiper 1 for machine tools has a wiper main body 2 formed from rubber and a supporting member 4 bonded to the wiper main body 2, and is configured to be attachable to a lower face of a distal end portion of a covering member 5 via a fixture or the like. The wiper 1 for machine tools prevents swarf or the like present on an outer face of the covering member 5 from entering the inside of the cover through a clearance by making a lip portion 3 formed at a distal end portion of the wiper main body 2 be in sliding contact with the outer face of the covering member 5 at the inner side (see, for example, [Related Art] of Patent Literature 1).

CITATION LIST

Patent Literature

Patent Literature 1: Japanese Unexamined Patent Publication No. 2000-308944

SUMMARY OF INVENTION

Technical Problems

When attached to a covering member, such a wiper for machine tools as shown in FIG. 10 has a large part of a wiper main body exposed outside the covering member. Therefore, this wiper for machine tools has a shape that fails to avoid contact of swarf (chips) with the wiper main body when used.

Therefore, contact of chips or the like with the wiper main body during use of the wiper for machine tools might cause generation of cracking in the wiper main body, and further cause damages to the wiper main body, resulting in a problem of insufficient reliability of the wiper.

Such a wiper for machine tools as shown in FIG. 10 is manufactured by integrally molding a wiper main body and a supporting member. When a wiper for machine tools is manufactured by integral molding, there is a problem that after molding, a step of removing a burr generated in a molded article is required, resulting in an increase in the number of steps. In particular, when a wiper member having such a shape as shown in Patent Literature 1 is integrally molded, there is a problem that a burr is liable to be generated at an edge portion.

Another problem is that along with the need of a metal mold exclusive to integral molding and an increase in the number of steps, productivity is hardly improved to increase manufacturing cost.

Solutions to Problems

The present inventors have devoted themselves to study for solving these problems, and have completed the present invention.

A sealing member for machine tools of the present invention includes a supporting member; a plate-shaped elastic member; and an adhesive layer which bonds the elastic member to the supporting member. The supporting member has a shape of a bent plate-like body, the elastic member is bonded to the supporting member via the adhesive layer laminated on a part of a front face of the elastic member so as to be curved along the bent shape of the supporting member, and a corner portion formed by a back face and one side face of the elastic member is assumed to be an edge portion in contact with an opposite material, and the one side face is formed by cutting.

In the sealing member for machine tools of the present invention, an angle formed by the back face and the one side face of the elastic member is preferably an acute angle.

Additionally, a corner portion formed by the front face and one side face of the elastic member is preferably chamfered.

Further, in the sealing member for machine tools of the present invention, the elastic member is preferably formed from a urethane elastomer.

Advantageous Effects of Invention

In a sealing member for machine tools of the present invention, to a supporting member having a shape of a bent plate-like body, a plate-shaped elastic member is bonded via an adhesive layer laminated on a part of a front face thereof as described above. The elastic member maintains a shape curved along the bent shape of the supporting member. This results in covering a part or the whole of the front face side of the elastic member with the supporting member in the sealing member for machine tools. Therefore, the front face of the elastic member will be protected by the supporting member, so that chips (swarf) hardly contact the front face of the elastic member during use of the sealing member for machine tools. As a result, the sealing member for machine tools is allowed to prevent chips from damaging the elastic member, thereby avoiding deterioration of sealing performance and ensuring high sealability for a long period of time.

Additionally, in the sealing member for machine tools of the present invention, the plate-shaped elastic member is bonded to the supporting member so as to maintain a curved state. When used, the sealing member for machine tools is attached to the supporting member such that resilience in a direction away from a contact face (including a sliding face) of an opposite material is continuously exerted on the elastic member. This enables the sealing member for machine tools to have a slide resistance that is hardly increased even when an amount of push-in to the side of the contact face of the opposite material is increased, and to have an increased contact area of a sliding contact portion in the elastic member with the opposite material by increasing the push-in amount. As a result, when the sealing member for machine tools of the present invention is repeatedly slid for a long period of time or even when the contact face of the opposite material has irregularities, there is no failing to function as a sealing member due to slipping-through of chips, damage to the elastic member or biting of the opposite material into the elastic member. Accordingly, the sealing member for machine tools of the present invention is capable of maintaining excellent performance for a long period of time, and has excellent reliability.

Additionally, in the sealing member for machine tools of the present invention, one side face of the elastic member forming an edge portion in contact with the opposite material is formed by cutting. Accordingly, the edge portion is a highly precise edge portion having excellent linearity without burrs or irregularities. Therefore, the sealing member for machine tools provided with the edge portion can exhibit highly excellent sealability.

Additionally, the sealing member for machine tools of the present invention can be manufactured by separately producing the supporting member and the elastic member, and then bonding the supporting member to the elastic member with the adhesive layer. Therefore, as compared with a conventional manufacturing method by integral molding of a supporting member and an elastic member, manufacturing steps are simple, and no dedicated molding metal mold or the like is required. Such a manufacturing method enables a sealing member for machine tools to be manufactured efficiently and at low cost.

BRIEF DESCRIPTION OF DRAWINGS

FIG. 3 is a sectional view schematically showing a part of a telescopic cover with the sealing member for machine tools shown in FIGS. 1A and 1B attached thereto.

DESCRIPTION OF EMBODIMENTS

In the following, embodiments of the present invention will be described with reference to the drawings.

A sealing member for machine tools of the present invention includes: a supporting member; a plate-shaped elastic member; and an adhesive layer which bonds the elastic member to the supporting member. The supporting member has a shape of a bent plate-like body, the elastic member is bonded to the supporting member via the adhesive layer laminated on a part of a front face of the elastic member so as to be curved along the bent shape of the supporting member, and a corner portion formed by a back face and one side face of the elastic member is assumed to be an edge portion in contact with an opposite material, and the one side face is formed by cutting.

Figure 1A:
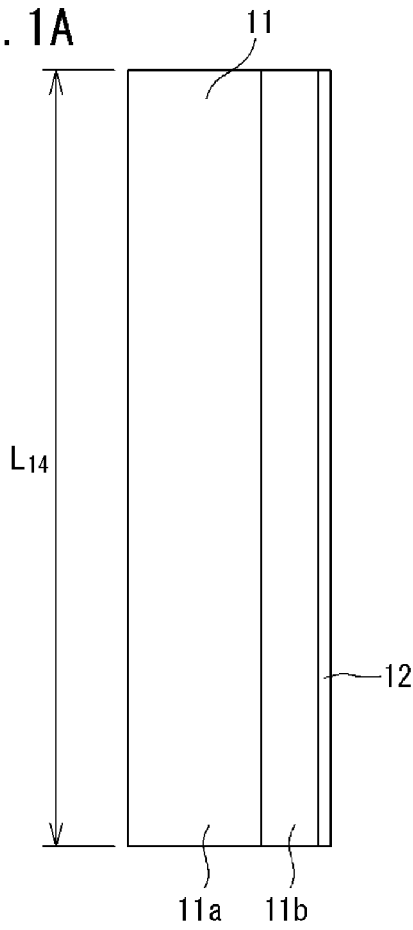
FIG. 1A is a plan view schematically showing one example of a sealing member for machine tools of the present invention.
Figure 1B:
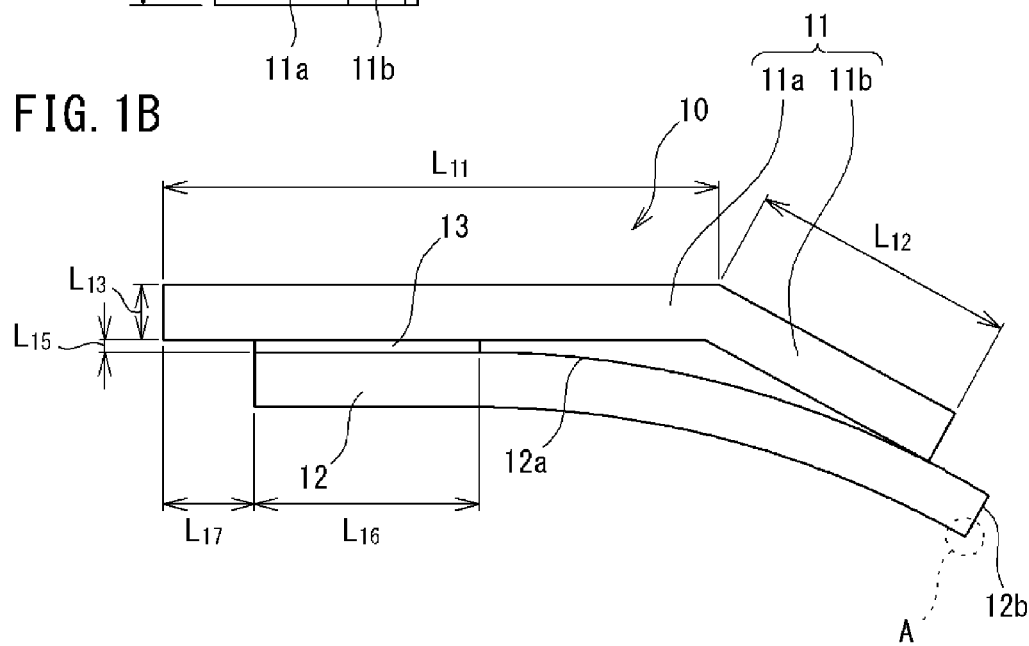
FIG. 1B is a side view of FIG. 1A.

FIG. 1A is a plan view schematically showing one example of a sealing member for machine tools of the present invention, and FIG. 1B is a side view of FIG. 1A.

As shown in FIGS. 1A and 1B, a sealing member 10 for machine tools of the present invention includes a supporting member 11 which is obtained by bending, along a longitudinal direction (in FIG. 1A, a vertical direction), a metal plate whose main face has a rectangular shape, and which is formed of a supporting portion 11a and a protective portion 11b, and a plate-shaped elastic member 12, the elastic member 12 being bonded to the supporting member 11 via an adhesive layer 13 so as to be curved along a bent shape of the supporting member 11. The adhesive layer 13 is laminated on a part of a front face 12a of the elastic member 12 to adhere the elastic member 12 to an inner face (in FIG. 1A, a lower side face) of the supporting portion 11a of the supporting member 11.

In this case, the elastic member 12 is curved along the bent shape of the supporting member 11 so as to be partly bonded to the supporting member 11 via the adhesive layer 13, while the front face at the side of an edge portion on which the adhesive layer 13 is not laminated is in contact with an inner face of the protective portion 11b of the supporting member 11. The protective portion 11b serves as a stopper which suppresses a return of the elastic member 12 due to resilience to an original shape, i.e. to a plate shape not curved, and plays a role of helping the elastic member 12 to maintain a shape curved along the bent shape of the supporting member 11.

Further, the protective portion 11b also has a role of covering and protecting the front face of the elastic member 12. Since a part of the elastic member 12 covered with the protective portion 11b is less liable to contact chips or the like during use of the sealing member for machine tools, the part is covered with the protective portion 11b.

In the sealing member for machine tools of the present invention, preferably, 80% or more of the front face of the elastic member is covered with the supporting member, and more preferably, 90% or more thereof is covered.

Additionally, in the sealing member 10 for machine tools, the elastic member 12 bonded to the supporting member 11 maintains a curved state. Therefore, as described above, on a contact part (edge portion and in a vicinity thereof) of the elastic member 12, resilience in a direction away from a contact face of the opposite material (in the example shown in FIG. 1B, an upward direction in the drawing) is continuously exerted.

When the sealing member 10 for machine tools contacts the opposite material or slides relative to the opposite material, the supporting member 11 plays a role of making the elastic member 12 maintain a state of contact with the opposite material, as well as having a role of attaching the sealing member 10 for machine tools to a telescopic cover or the like. The sealing member 10 for machine tools is attached to the telescopic cover or the like by bolting or the like.

Although suitable as a material of the supporting member is in general a metallic material such as steel or aluminum in view of durability and strength, ceramic or rigid plastic can be used as well.

Additionally, also usable are a surface untreated steel plate, a steel plate subjected to such surface treatment as zinc phosphate treatment, chromating or anticorrosive resin treatment, a resilient metal plate of phosphor bronze, spring steel, or the like.

The supporting member may be surface-treated with a primer such as a urethane-based primer or a silane-based primer in advance in order to improve conformability with the adhesive layer.

The front face (in particular, a region contacting the adhesive layer) of the supporting member may be subjected to surface-roughening treatment in order to improve adhesion to the adhesive layer by an anchor effect.

The supporting member is not necessarily limited to one produced by bending one plate-like body, but may be, for example, one obtained by bonding two flat plates together at a predetermined angle.

As shown in FIGS. 1A and 1B, the supporting member is a member having a shape of a bent plate-like body. A bending position of the supporting member, and an angle formed by the supporting portion and the protective portion are not particularly limited, and any shape can be used that is capable of making the elastic member curve and maintain the curve.

The angle formed by the supporting portion and the protective portion is preferably 90° to 170°. More preferably, it is 110° to 160°.

The elastic member 12 is a member contacting the opposite material when the sealing member 10 for machine tools is used, which comes into contact with the opposite material at the edge portion (a corner portion formed by a back face and a side face of the elastic member 12 on the side contacting the opposite material: in FIG. 1B, a part of A).

The elastic member 12 is bonded to the supporting member in such a state that the plate-shaped member is curved along the bent shape of the supporting member as described above.

In the following, a specific shape of the elastic member will be described based on a shape before the elastic member is curved.

Figure 2A:
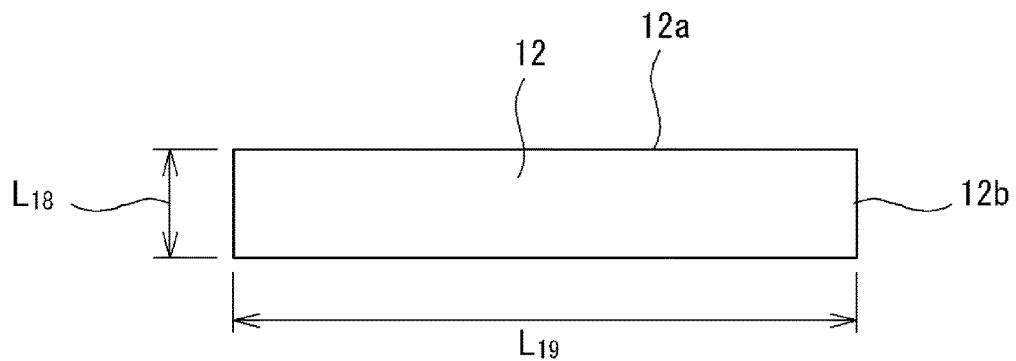
FIG. 2A to FIG. 2C are side views each schematically showing a state of an elastic member constituting the sealing member for machine tools of the present invention before the elastic member is curved.
Figure 2B:
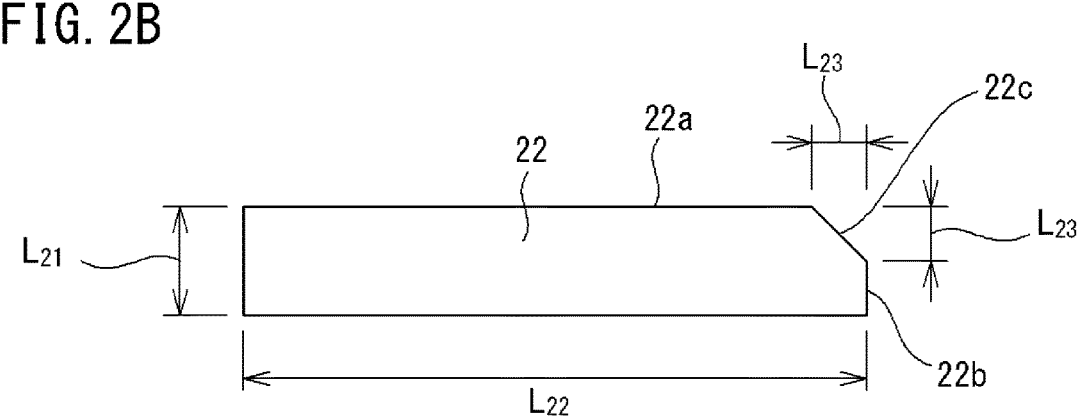
Figure 2C:
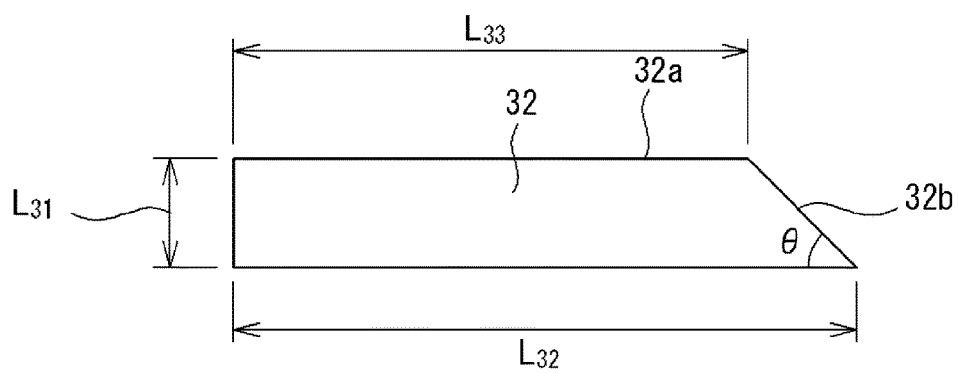

FIGS. 2A to 2C are side views each schematically showing a state of an elastic member constituting the sealing member for machine tools of the present invention before the elastic member is curved. In the description of each drawing, the upper side of the drawing is assumed to represent the front face of the elastic member, and the right side of the drawing is assumed to represent the side face constituting the edge portion.

The elastic member 12 shown in FIG. 2A, which is included in the sealing member 10 for machine tools shown in FIGS. 1A and 1B, represents a shape of the plate-shaped member before being curved. The elastic member 12 is a plate-like body having adjacent faces being perpendicular to each other.

On the other hand, a shape of the elastic member in the sealing member for machine tools of the present invention is not limited to the shapes shown in FIGS. 1A and 1B, and FIG. 2A, and may be, for example, shapes shown in FIG. 2B and FIG. 2C.

An elastic member 22 shown in FIG. 2B is obtained by C-chamfering one part of the corner portion in the elastic member 12 shown in FIG. 2A.

When such elastic member 22 is bonded in a curved state to the supporting member (supporting portion) via the adhesive layer similarly to the elastic member 12 shown in FIGS. 1A and 1B, chips are less liable to stay at an edge portion of the elastic member 22 and an outer vicinity thereof while the slide resistance is maintained during use of the sealing member for machine tools. Therefore, deterioration, damages and the like of the elastic member due to chips are less liable to be generated, so that sealability is suitably maintained for a long period of time.

Additionally, when the corner portion of the elastic member is C-chamfered as shown in FIG. 2B, an angle formed by a front face 22a of the elastic member 22 and a chamfered face 22c is preferably 100° to 150°, and more preferably 110° to 140°.

In the present invention, when the corner portion of the elastic member is chamfered, the chamfering is not limited to C-chamfering, and may be other chamfering such as R-chamfering.

In an elastic member 32 shown in FIG. 2C, a side face 32b of the elastic member 32 constituting an edge portion is obliquely formed relative to a front face 32a and a back face of the elastic member 32, and an angle (in the drawing, θ) formed by the back face of the elastic member 32 and the side face 32b constituting the edge portion is an acute angle.

In the elastic member, making the side face 32b constituting the edge portion have such a shape results in making chips less liable to stay at the edge portion of the elastic member 32 and an outer vicinity thereof while maintaining the slide resistance during use of the sealing member for machine tools. Therefore, deterioration, damages and the like of the elastic member due to chips are less liable to be generated, so that sealability is suitably maintained for a long period of time.

In the elastic member, when the side face of the elastic member constituting the edge portion is obliquely formed relative to the front face and the back face of the elastic member, an angle (in FIG. 2C, θ) formed by the back face of the elastic member and the side face constituting the edge portion may be appropriately selected in consideration of, for example, a curved state of the elastic member. Generally, the angle θ is preferably on the order of 30° to 80°. When the angle is less than 30°, an area of the edge portion in which the elastic member and the opposite material come into contact with each other is increased, resulting in increasing a slide resistance and the like during use of the sealing member for machine tools in some cases. On the other hand, when the angle is more than 80°, an effect of preventing accumulation of chips is hard to be obtained. More preferably, the angle is 40° to 70°.

In the sealing member for machine tools of the present invention, the shape of the elastic member is not limited to the shapes shown in FIGS. 1A and 1B, and FIGS. 2A to 2C, but for example, a chamfered part of an elastic member whose corner portion is chamfered may be a corner portion constituting an edge portion. Additionally, the elastic member may have a plurality of corner portions subjected to chamfering.

Additionally, when the side face of the elastic member constituting the edge portion is obliquely formed, the side face and the front face of the elastic member may form an acute angle, and the side face and the back face of the elastic member may form an obtuse angle.

In the elastic member, the side face (in FIGS. 2A to 2C, 12b, 22b and 32b) constituting the edge portion is preferably formed by cutting.

A face formed by cutting has extremely high flatness and makes the edge portion have an extremely sharp shape (a shape excellent in linearity). Therefore, the edge portion of the elastic member is allowed to reliably come into contact with the opposite material to maintain a contact state when sliding relative to the opposite material. Additionally, also when the sealing member for machine tools is used as a telescopic seal, excellent sealability can be obtained.

The cutting may be conducted using, for example, an ultrasonic cutter.

The C-chamfered face (in FIG. 2B, 22c) is also preferably formed by cutting using an ultrasonic cutter or the like.

Examples of a material of the elastic member include an NBR (nitrile-butadiene rubber), a urethane elastomer, a fluororubber, a silicone rubber, and an EPDM (ethylene propylene diene rubber) because a use object is a machine tool that requires oil-resistance.

Among these, the urethane elastomer is preferable. Because of excellent durability (wear resistance) of the urethane elastomer, desired performance can be maintained for a long period of time.

Examples of the urethane elastomer include a product obtained by reaction with a polyol and a polyisocyanate, and a crosslinker as necessary.

The polyol is not particularly limited, and examples of the polyol include a polyester polyol, a polyether polyol, and a polycaprolactone polyol.

The polyol preferably has a number average molecular weight of 1000 to 3000. Using a polyol having a number average molecular weight in this range enables entering of chips, a coolant or the like to be more reliably prevented at the time of contact with an opposite material.

The number average molecular weight is a value measured in terms of polystyrene by GPC (gel permeation chromatography).

Examples of the polyester polyol include a product obtained by allowing a dicarboxylic acid to react with a glycol by a routine procedure.

Examples of the dicarboxylic acid include aromatic dicarboxylic acids such as terephthalic acid, isophthalic acid and 2,6-naphthalenedicarboxylic acid, aliphatic dicarboxylic acids such as adipic acid, azelaic acid, and sebacic acid, oxycarboxylic acids such as hydroxybenzoic acid, and ester-forming derivatives thereof. Among these, adipic acid is preferable in view of excellent wear resistance.

Examples of the glycol include aliphatic glycols such as ethylene glycol, 1,4-butanediol, diethylene glycol, neopentyl glycol, 3-methyl-1,5-pentanediol, 1,9-nonane diol, and triethylene glycol, alicyclic glycols such as 1,4-cyclohexanedimethanol, aromatic diols such as p-xylenediol, and polyoxyalkylene glycols such as polyethylene glycol, polypropylene glycol, and polytetramethylene glycol. The glycol is preferably an aliphatic glycol, and more preferably ethylene glycol or 1,4-butanediol.

A polyester polyol as a reaction product of a dicarboxylic acid and a glycol, which has a linear structure, may be a branched polyester made from an ester-forming component having a valence of 3 or more.

Examples of the polyether polyol include polyalkylene glycols such as polyethylene glycol, polypropylene glycol, polytetramethylene glycol, and copolymers thereof. Among these, in view of excellent wear resistance, polytetramethylene glycol is preferable.

Examples of the polycaprolactone polyol include a product obtained by ring-opening addition of ε-caprolactone by using a low-molecular-weight glycol as an initiator in the presence of a catalyst.

Preferably used as the low-molecular-weight glycol are, for example, dihydric alcohols such as ethylene glycol, propylene glycol, 1,3-butylene glycol, and neopentyl glycol, and trihydric alcohols such as trimethylene glycol and glycerin. Preferably used as the catalyst are organotitanium compounds such as tetrabutyl titanate, tetrapropyl titanate, and tetraethyl titanate, and tin-based compounds such as tin octylate, dibutyltin oxide, dibutyltin laurate, stannous chloride, and stannous bromide.

Other than the ε-caprolactone, other cyclic lactones such as trimethyl caprolactone and valerolactone may be mixed in part.

The polyols may be used alone or in combination of two or more thereof.

The polyisocyanate is not particularly limited, and a conventionally known polyisocyanate can be used. Examples of the polyisocyanate include aliphatic isocyanates, alicyclic isocyanates, and aromatic isocyanates. Among these, in view of excellent wear resistance, aromatic isocyanates are preferable.

Examples of the aliphatic isocyanate include 1,6-hexamethylene diisocyanate (HDI), 2,2,4-trimethyl hexamethylene diisocyanate, and lysine diisocyanate. Additionally, the examples also include modified products such as isocyanurates, biuret, and adducts of hexamethylene diisocyanate and isophorone diisocyanate.

Examples of the alicyclic isocyanate include alicyclic diisocyanates such as isophorone diisocyanate (IPDI), 4,4'-dicyclohexylmethane diisocyanate, 1,4-cyclohexane diisocyanate, and norbornane diisocyanate (NBDI).

Examples of the aromatic isocyanate include tolylene diisocyanate (TDI), phenylene diisocyanate, 4,4'-diphenylmethane diisocyanate (MDI), 1,5-naphthalene diisocyanate, xylylene diisocyanate (XDI), carbodiimide-modified MDI, and urethane-modified MDI.

The polyisocyanates may be used alone or in combination of two or more thereof.

Examples of the crosslinker include ethylene glycol, propylene glycol, butanediol, hexanediol, diethylene glycol, trimethylolpropane, glycerin, hydrazine, ethylenediamine, diethylenetriamine, 4,4'-diaminodiphenyl methane, 4,4-diaminodicyclohexylmethane, N,N-bis(2-hydroxypropyl) aniline, and water.

Among these, in view of excellent oil-resistance, butanediol and trimethylolpropane are preferable.

The crosslinkers may be used alone or in combination of two or more thereof.

The polyurethane elastomer can be manufactured by a known method using the above materials. The elastomer can be manufactured by, for example, allowing the materials to react with each other such that an equivalent ratio of NCO/OH of each material is adjusted to be 0.9 to 1.1 by using a catalyst as required in an appropriate organic solvent. The elastomer can also be manufactured by, for example, subjecting the materials to melting reaction without using a solvent. Additionally, the elastomer can also be manufactured by simultaneously allowing all the materials to react with each other (one-shot process), by a prepolymer process, or the like.

A method of molding the elastic member is not particularly limited, and for example, may be atmospheric pressure cast molding, reduced pressure cast molding, centrifugal casting, continuous rotation molding, extrusion molding, injection molding, reactive injection molding (RIM), or spin coating.

Among these, centrifugal casting and continuous rotation molding are preferable.

A hardness of the elastic member (JIS A hardness) is preferably 55° to 90°.

With the hardness of less than 55°, the elastic member might be deformed when sliding relative to an opposite material during use of the sealing member for machine tools, resulting in failing to reliably prevent entering of chips. On the other hand, when the hardness is more than 90°, the elastic member is too hard and might be damaged at the time of sliding. The hardness of the elastic member is more preferably 60° to 75°.

The JIS A hardness is a value measured by a spring type A hardness testing machine in accordance with JIS K 7312.

An impact resilience of the elastic member is preferably 10% to 50%.

When sliding relative to the opposite material, the elastic member is required to have adaptability for following irregularities on a front face of a sliding contact face of the opposite material and performance that prevents abnormal noise (chattering sound) at the time of sliding. Although these are properties having a tradeoff relation therebetween, by setting an impact resilience of the elastic member to be within the above range, both the properties having a tradeoff relation can be obtained. The impact resilience is more preferably 20% to 40%.

The impact resilience is a value measured in accordance with JIS K 7312.

The elastic member may further contain short fibers. This also enables adjustment of the hardness or the like of the elastic member.

As the short fibers, for example, polyamide fibers are preferably used because of excellent compatibility with a rubber component (elastomer component).

The short fibers suitably have an aspect ratio of 5 or more and a thickness on the order of 1 to 10 denier.

When the short fibers are contained, its content is preferably on the order of 1 to 100 parts by weight relative to 100 parts by weight of the rubber component (elastomer component).

The adhesive layer 13 is for bonding the elastic member 12 to the supporting member 11. The adhesive layer 13 is not particularly limited as long as it is capable of bonding the elastic member to the supporting member with sufficient adhesion. A material of the adhesive layer may be appropriately selected in consideration of materials of the supporting member and elastic member.

The adhesive layer may be formed from, for example, an EVA-based, polyamide-based or polyurethane-based hot melt adhesive, or a curing type adhesive, or further may be formed from a double-sided adhesive tape.

When the elastic member is made from a urethane elastomer, the adhesive layer is preferably formed from a urethane-based hot melt adhesive in view of an excellent bonding strength with the supporting member and the elastic member. In particular, the layer is preferably formed from a moisture curable urethane-based hot melt adhesive. It is because when the moisture curable urethane-based hot melt adhesive is used, even if the sealing member for machine tools is heated to a high temperature during use, the adhesive layer will be neither melted nor softened to maintain stable adhesiveness.

The moisture curable urethane-based hot melt adhesive is an adhesive which, in a melted state, is applied and adhered to the elastic member and/or the supporting member, and then reacts with moisture attached to the front face of the elastic member and/or the supporting member, or with moisture in an atmosphere to have gradual crosslinking reaction proceed, and which contains a urethane prepolymer.

Specifically, it is possible to use an adhesive containing, for example, 30 to 50% by weight of a urethane prepolymer (e.g. a polycarbonate-based urethane prepolymer), 0 to 70% by weight of a thermoplastic resin, and 0 to 50% by weight of a tackifier.

The urethane prepolymer has two or more isocyanate groups in a molecule, and reacts with moisture contained in an atmosphere to be cured.

Examples of the thermoplastic resin include a saturated polyester. In the moisture curable urethane-based hot melt adhesive, the thermoplastic resin plays a role of increasing adhesion by imparting crystallinity and a role as a plasticizer to enable application at a temperature on the order of 120° C. to 140° C. Blending the thermoplastic resin makes the moisture curable urethane-based hot melt adhesive excellent in workability at low temperature.

As the moisture curable urethane-based hot melt adhesive, commercially available products can also be used. Specific examples of the commercially available products include TYFORCE H-810, TYFORCE H-850, TYFORCE PUR-1S, TYFORCE H-910, TYFORCE FH-445, TYFORCE FH-315SB, TYFORCE FH-430, and TYFORCE FH-00SB (all manufactured by DIC Corporation), RHC-101 and 5921 (manufactured by No-tape INDUSTRIAL CO., LTD.), and HI-BON 4836M, HI-BON 4836S, and HI-BON 4836W (manufactured by Hitachi Kasei Polymer Co., Ltd.).

Among these, TYFORCE H-810 and TYFORCE H-850 are preferable.

The thickness of the adhesive layer 13 is not particularly limited, but is preferably 50 μm to 500 μm.

When the adhesive layer 13 is made from a hot melt adhesive, the thickness of the adhesive layer 13 is preferably 50 μm to 200 μm. When the thickness of the adhesive layer 13 made from a hot melt adhesive is less than 50 μm, sufficient adhesion might not be ensured. On the other hand, when the thickness is more than 200 μm, melting of a hot melt adhesive sometimes requires excess temperature and time.

In the sealing member for machine tools of the present invention, a spring steel may be adhered to the elastic member.

Adhering the spring steel enables further reduction of a slide resistance of the sealing member for machine tools and improvement of a product life. Additionally, adhering the spring steel to the elastic member enables suppression of contact of chips or the like with the elastic member.

The sealing member for machine tools of the present invention can be manufactured by producing the supporting member and the elastic member separately, and then bonding the supporting member and the elastic member together with an adhesive. Therefore, as compared with manufacturing by integral molding of the supporting member and the elastic member, it is unnecessary to prepare a dedicated metal mold and to perform deburring after integral molding. Therefore, the sealing member for machine tools of the present invention can be manufactured by a reduced number of steps at low cost.

Additionally, according to the present invention, at the production of the elastic member, the side face of the elastic member constituting the edge portion is formed by cutting. Therefore, the manufactured sealing member for machine tools resultantly has an edge portion with excellent precision.

Specifically, the sealing member for machine tools can be manufactured by the following method, for example.

(1) A steel plate or the like as a starting material is cut into a predetermined size, and then the plate is subjected to such process as bending and curving as necessary to produce a supporting member.

(2) Separately from the production of the supporting member in the above (1), first, a sheet-like product made from an elastic material such as a urethane elastomer is produced. Thereafter, the sheet-like product is cut into a predetermined size by using an ultrasonic cutter or the like to produce an elastic member.

A method of molding the sheet-like product (an elastic member molding method) is as described above.

(3) The elastic member produced in the above (2) is first fixed to a jig having the same curved face as that of an elastic member of a finished product by vacuum suction or the like. Next, to a part of the front face of the elastic member, an adhesive is applied using an applicator or the like. Thereafter, at a predetermined position on the elastic member to which the adhesive has been applied, the supporting member produced in the above (1) is placed, and is pressurized and/or cured as necessary.

Through these steps, the sealing member for machine tools of the present invention can be manufactured.

In various machine tools such as a lathe and a miller, the sealing member for machine tools of the present invention can be used as a sealing member (wiper member) which protects a sliding part, a sliding mechanism or the like of a machine tool from chips, a coolant (cutting oil) or the like. Specifically, the sealing member for machine tools can be used as, for example, a slide seal, a telescopic seal, a covering seal or a lip seal.

The sealing member for machine tools of the present invention is suitable as the telescopic seal in particular.

In the following, description will be made about an example of use with respect to a case where the sealing member for machine tools of the present invention is used as a telescopic seal. FIG. 3 is a sectional view schematically showing a part of a telescopic cover with the sealing member for machine tools shown in FIGS. 1A and 1B attached thereto.

As shown in FIG. 3, the sealing member 10 for machine tools of the present invention is fixed by bolting (not shown) the supporting member 11 to a lower face of an outer distal end portion of each covering member 15 constituting the telescopic cover. In this case, the sealing member 10 for machine tools is attached to a position where an outer face 15a of the covering member 15 located below and an end portion of the elastic member 12 are securely in sliding contact with each other.

When fixing the sealing member 10 for machine tools to the covering member 15 by bolting, a through hole for bolting may be formed not only in the supporting member but also in the elastic member.

Thus, the telescopic cover in which the sealing member 10 for machine tools is attached to the outer distal end portion of each covering member 15 is capable of preventing chips or the like presented outside the telescopic cover from entering inside the cover when the telescopic cover stretches.

As a matter of course, use of the sealing member for machine tools of the present invention is not limited to a telescopic seal.

Figure 4:
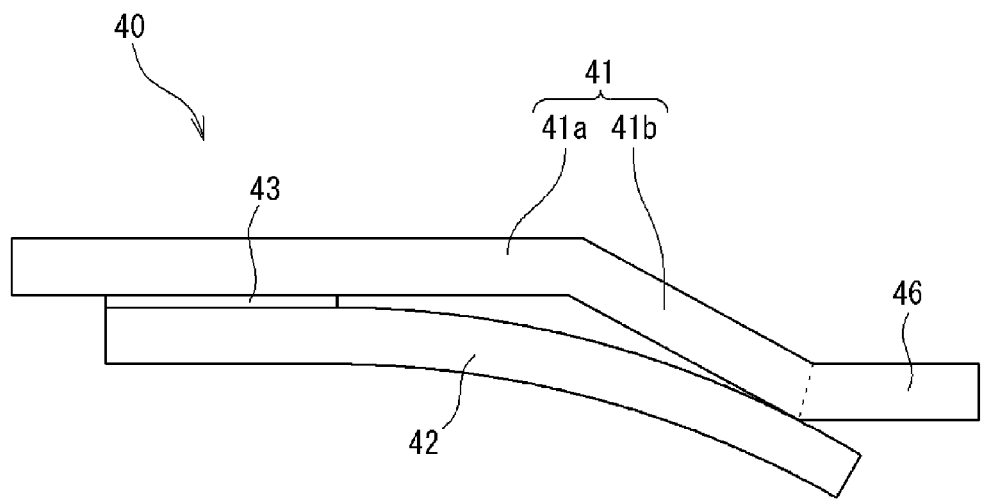
FIG. 4 is a side view schematically showing another example of the sealing member for machine tools of the present invention.

The sealing member for machine tools of the present invention may have a structure as shown in FIG. 4.

Figure 5:
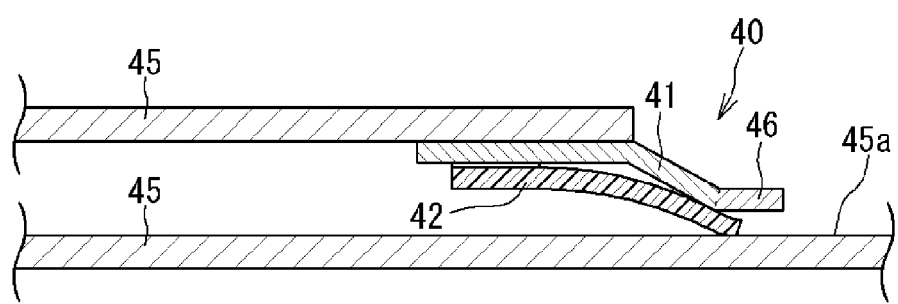
FIG. 5 is a sectional view schematically showing a part of a telescopic cover with the sealing member for machine tools shown in FIG. 4 attached thereto.
Figure 6:
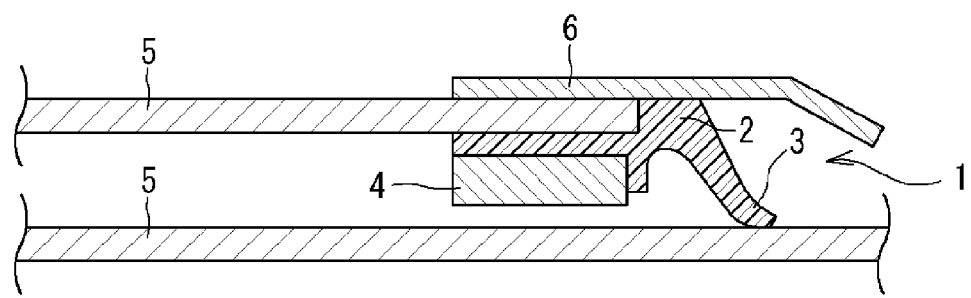
FIG. 6 is a sectional view schematically showing a part of one example in which a protective member is attached to a conventional telescopic cover.

FIG. 4 is a side view schematically showing another example of the sealing member for machine tools of the present invention. FIG. 5 is a sectional view schematically showing a part of a telescopic cover with the sealing member for machine tools shown in FIG. 4 attached thereto. FIG. 6 is a sectional view schematically showing a part of one example in which a protective member is attached to a conventional telescopic cover.

In a sealing member 40 for machine tools shown in FIG. 4, a second protective portion 46 is provided at a distal end of a supporting member 41 (an end of a protective portion (first protective portion) 41b on a side opposite (in the drawing, left side) to a supporting portion 41a). The sealing member 40 for machine tools differs from the sealing member 10 for machine tools shown in FIGS. 1A and 1B in that it includes the second protective portion 46, and is the same as the sealing member 10 for machine tools in the remaining configuration. Specifically, in the sealing member 40 for machine tools, materials, shapes and the like of the supporting member 41, an elastic member 42, and an adhesive layer 43 are the same as those of the supporting member 11, the elastic member 12, and the adhesive layer 13 of the sealing member 10 for machine tools shown in FIGS. 1A and 1B, respectively.

The sealing member 40 for machine tools produces the same effect as that of the sealing member 10 for machine tools shown in FIGS. 1A and 1B, and further, can more reliably prevent chips from coming into contact with the elastic member.

Similarly to the sealing member 10 for machine tools shown in FIGS. 1A and 1B, the sealing member 40 for machine tools shown in FIG. 4 can be used as the telescopic seal or the like.

In this case, as shown in FIG. 5, the sealing member 40 for machine tools is fixed by bolting (not shown) the supporting member 41 to a lower face of an outer distal end portion of a covering member 45 constituting the telescopic cover. In this case, the sealing member 40 for machine tools is attached to a position where an outer face 45a of the covering member 45 located below and an end portion of the elastic member 42 are securely in sliding contact with each other.

Being provided with the second protective portion 46 at the distal end of the supporting member 41, the sealing member 40 for machine tools can reliably suppress contacting of chips or the like with the elastic member.

In recent machine tools, as a processing speed is increased, a speed of collision of chips against a sealing member and a chip temperature are increased. Additionally, in recent machine tools, with an improvement in a coolant (lubricating oil), shapes of chips (shapes of sections of the chips) generated during machining are sharp.

Under these circumstances, in a recent machine tool, when chips come into contact with an elastic member, the elastic member is more liable to be damaged (for example, the elastic member is torn off, or the elastic member is deteriorated due to the high temperature).

By contrast, as shown in FIG. 6, there has been proposed a conventional wiper 1 for machine tools in which apart from the wiper 1 for machine tools, a protective member 6 made of metal is attached for preventing chips from coming into contact with a wiper main body 2.

However, attaching the protective member 6, which means attaching another member, leads to a problem of a cost increase. A further problem is preventing a device (telescopic wiper) from being compact. A still further problem is that when the protective member 6 is attached to an upper face of the covering member 5, a step is generated between an upper face of the protective member 6 and the upper face of the covering member 5, so that chips, a coolant or the like might stay in the step portion to hinder operation (cutting process etc.) of a machine tool.

The sealing member 40 for machine tools can avoid such a problem, and it is also possible to make the sealing member 40 for machine tools compact even when the second protective portion 46 is provided. Additionally, because the second protective portion 46 can be integrated with the supporting member 41 in the sealing member 40 for machine tools, the sealing member 40 for machine tools can be provided at low cost.

In the sealing member 40 for machine tools, when the supporting member 41 having the supporting portion 41a and the protective portion (the first protective portion) 41b is produced by bending a steel plate or the like, the second protective portion 46 can be integrally produced with the supporting member 41 by further bending the steel plate at another part. Additionally, the second protective portion 46 may be attached to the distal end of the supporting member 41 after being produced separately from the supporting member 41.

In the sealing member 40 for machine tools, similarly to the protective portion 11b of the sealing member 10 for machine tools shown in FIGS. 1A and 1B, the first protective portion 41b has a role of protecting a part of the elastic member 42, as well as making the elastic member 42 maintain the curved shape along the bent shape of the supporting member 41.

EXAMPLES

In the following, while the present invention will be described more specifically with respect to examples, the present invention is not limited to the following examples.

Example 1

A sealing member for machine tools having the shape as shown in FIGS. 1A and 1B was produced by a method set forth below.

(1) A supporting member formed of a supporting portion and a protective portion as shown in FIGS. 1A and 1B was produced by cutting a steel plate (KOBE STEEL. LTD., Kobe zinc GX-BX) with a thickness of 1.2 mm into 18.3 mm×100 mm, and bending the cut piece at a part 6 mm away from one long side thereof in parallel to the long side. An angle formed by the supporting portion and the protective portion was set to be 150°.

(2) Separately from the production of the supporting member, a urethane sheet (made from polycaprolactone ester polyol-MDI-glycol-crosslinked polyurethane, JIS A hardness: 70°, impact resilience: 35% (25° C.)) with a thickness of 1.2 mm was molded by the method set forth below. Thereafter, the obtained urethane sheet was cut into a 17 mm×100 mm×1.2 mm piece by using an ultrasonic cutter to produce an elastic member.

(Molding of Urethane Sheet)

First, 100 parts by weight of CORONATE 4086 (manufactured by Nippon Polyurethane Industry Co., Ltd., a prepolymer of polycaprolactone ester polyol and MDI) was heated to 70° C. to be dissolved, to which 4.90 parts of 1,4-butanediol heated to 70° C. and 1.96 parts of trimethylolpropane heated to 70° C. were added and stirred to obtain a urethane composition. Subsequently, the obtained urethane composition was injected into a metal mold (internal volume: thickness of 1.2 mm, width of 100 mm, length of 230 mm) heated to 125° C. and then crosslinked in the mold in an oven maintained at 125° C. for 30 minutes. Thereafter, the molded article was taken out and heated in the oven at 110° C. for 12 hours to be then crosslinked, thereby producing a urethane sheet.

(3) Being in a curved state, the elastic member produced in the above (2) was fixed to a jig by vacuum suction. Next, a moisture curable hot melt adhesive (manufactured by DIC Corporation, TYFORCE H-850) heated to 120° C. was applied with a width of 5 mm to a part of the front face of the elastic member using an applicator. Thereafter, at a predetermined position on the elastic member to which the adhesive has been applied, the supporting member produced in the above (1) was placed and pressured for 10 seconds. After stopping the pressurization, the members were left at room temperature for 5 hours to complete a sealing member for machine tools with the supporting member and the elastic member bonded to each other via an adhesive layer having a thickness of 0.1 mm.

The produced sealing member for machine tools has the following size.

$L_{11}$=12.3 mm, $L_{12}$=6 mm, $L_{13}$=1.2 mm, $L_{14}$=100 mm, $L_{15}$=0.1 mm, $L_{16}$=5 mm, $L_{17}$=2 mm, $L_{18}$=1.2 mm, $L_{19}$=17 mm (regarding the reference signs, see FIGS. 1A and 1B and FIG. 2A).

Example 2

Using the same method as in Example 1, a urethane sheet with a thickness of 1.2 mm was produced, and this urethane sheet was cut into a 17.6 mm×100 mm piece by using an ultrasonic cutter. Thereafter, a corner portion formed by a front face and a side face constituting an edge portion was C-chamfered at 0.6 mm×45° with an ultrasonic cutter, thereby producing an elastic member.

By the same manner as in Example 1, except that the obtained elastic member was used, a sealing member for machine tools was produced with the elastic member bonded to a supporting member via an adhesive layer.

The produced sealing member for machine tools has the following size. $L_{21}$=1.2 mm, $L_{22}$=17.6 mm, $L_{23}$=0.6 mm (regarding the reference signs, see FIG. 2B).

Example 3

Using the same method as in Example 1, a urethane sheet with a thickness of 1.2 mm was produced, and this urethane sheet was cut to have a front face size of 17.0 mm×100 mm and a back face size of 18.2 mm×100 mm by using an ultrasonic cutter, thereby producing an elastic member.

By the same manner as in Example 1, except that the obtained elastic member was used, a sealing member for machine tools was produced with the elastic member bonded to a supporting member via an adhesive layer.

The produced sealing member for machine tools has the following size.

$L_{31}$=1.2 mm, $L_{32}$=18.2 mm, $L_{33}$=17 mm, θ=45° (regarding the reference signs, see FIG. 2C).

Comparative Example 1

Figure 7:
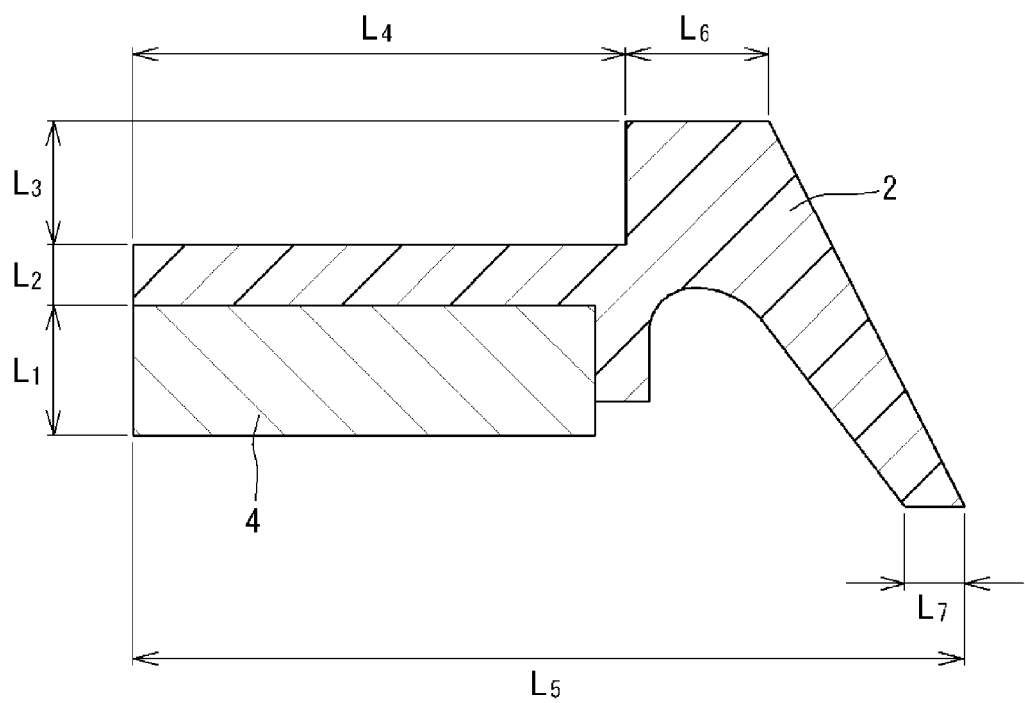
FIG. 7 is a sectional view schematically showing a sealing member for machine tools produced in Comparative Example 1.

A sealing member for machine tools having the shape as shown in FIG. 7 was produced by a method set forth below.

Specifically, 100 parts by weight of CORONATE 4086 (manufactured by Nippon Polyurethane Industry Co., Ltd.) was heated to 70° C. to be dissolved, to which 4.90 parts of 1,4-butanediol heated to 70° C. and 1.96 parts of trimethylolpropane heated to 70° C. were added and stirred. Subsequently, the liquid mixture was heated to 125° C. and injected into a split metal mold (lower mold) having a section as shown in FIG. 7 in which a supporting member made of brass was placed. Then, the liquid mixture was covered with the split metal mold (upper mold) and cross-linked in an oven at 125° C. for 30 minutes. Next, the molded article was taken out, then crosslinked in the oven at 110° C. for 12 hours and further subjected to burring with a cutter knife, thereby making a sealing member for machine tools.

The produced sealing member for machine tools has the following size.

$L_1$=2.0 mm, $L_2$=1.0 mm, $L_3$=2.0 mm, $L_4$=10.0 mm, $L_5$=16.0 mm, $L_6$=3.0 mm, $L_7$=1.0 mm (regarding the reference signs, see FIG. 7).

With respect to the sealing members for machine tools produced in examples and comparative example, the following tests were conducted to evaluate performance thereof.

(1) Measurement of Slide Resistance of Sealing Member for Machine Tools

Figure 8:
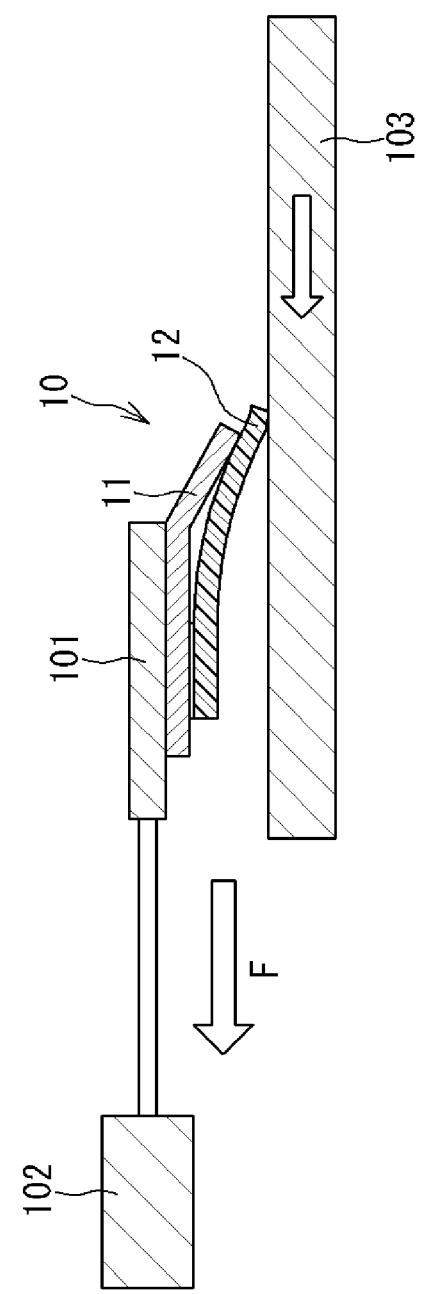
FIG. 8 is a sectional view for explaining a method of measuring slide resistances of the sealing members for machine tools produced in examples and comparative example.

Using a testing machine shown in FIG. 8, slide resistances of the sealing members for machine tools were measured. The measurement was conducted at room temperature. FIG. 8 is a sectional view for explaining a method of measuring slide resistances of the sealing members for machine tools produced in examples and comparative example.
(Measurement Method)

As shown in FIG. 8, after fixing the sealing member 10 for machine tools beneath a saddle 101, the saddle 101 was lowered toward a sliding bed 103, and from a point where the edge portion of the elastic member 12 contacts the sliding bed 103, the saddle 101 (sealing member 10 for machine tools) was further pushed down by 0.5 mm to the side of the sliding bed 103.

Next, in this state, the sliding bed 103 was shifted in a direction of an arrow (in the drawing, in a direction toward the left side) at a moving speed of 100 m/min and a force (pressing force) F in a horizontal direction exerted on the saddle 101 was detected by a load cell 102. In this way, a slide resistance (N/cm$^2$) was measured. To a front face (face on which the sealing member 10 for machine tools slides) of the sliding bed 103, a lubricating oil (manufactured by Taiyu Co., Ltd., water-soluble cutting liquid HI-CHIP NC-11) was applied in advance. Results of the measurement are shown in Table 1.

TABLE 1

|  | Slide resistance (N/cm$^2$) |
|---|---|
| Example 1 | 0.37 |
| Example 2 | 0.39 |
| Example 3 | 0.42 |
| Comparative Example 1 | 0.80 |

(2) Performance Evaluation of Sealing Member for Machine Tools

Figure 9:
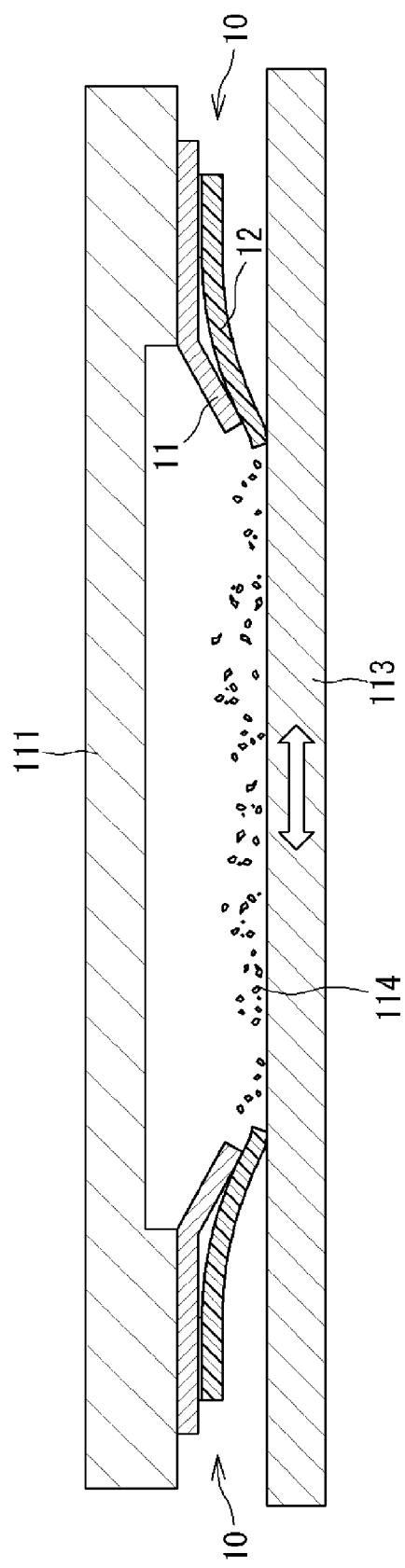
FIG. 9 is a sectional view for explaining a method of evaluating performance of the sealing members for machine tools produced in examples and comparative example.
Figure 10:
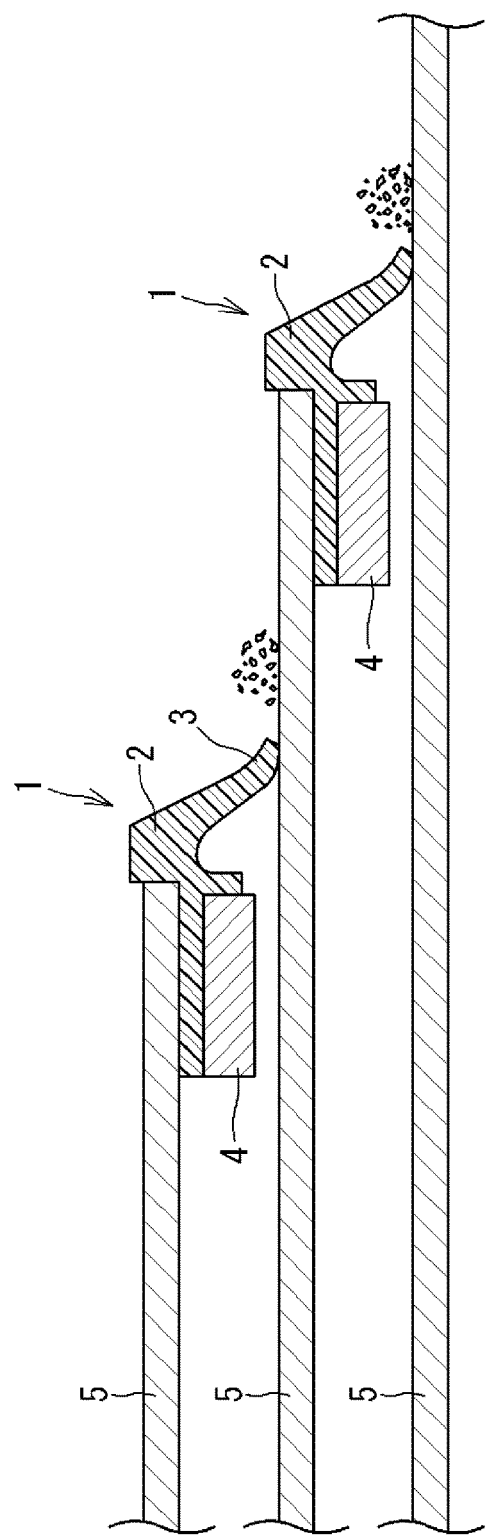
FIG. 10 is a sectional view schematically showing a part of a conventional telescopic cover.

Using a testing machine shown in FIG. 9, performance of the sealing members for machine tools was evaluated. The evaluation was conducted at room temperature. FIG. 9 is a sectional view for explaining a method of evaluating performance of the sealing members for machine tools produced in examples and comparative example.
(Evaluation Method)

As shown in FIG. 9, below both ends of a saddle 111, two sealing members 10 for machine tools having the same height were respectively fixed such that edge portions of the elastic members 12 are opposed to each other. Thereafter, the saddle 111 was lowered toward a sliding bed 113, and from a point where the end portion of the elastic member 12 contacts the sliding bed 113, the saddle 111 (sealing member 10 for machine tools) was further pushed down to the side of the sliding bed 113 by 0.5 mm. In this case, between the two sealing members 10 for machine tools, 100 g of metal chips 114 were enclosed in advance, while to a front face (face on which the sealing member 10 for machine tools slides) of the sliding bed 113, a lubricating oil (manufactured by Taiyu Co., Ltd., water-soluble cutting liquid HI-CHIP NC-11) was applied in advance.

Next, in this state, the sliding bed 113 was reciprocated a predetermined number of times (up to 20000 times) in a direction of an arrow (in the drawing, in a horizontal direction) at a moving speed of 30 m/min and at a slide stroke of 200 mm, and presence/absence of damages to the elastic member 12, presence/absence of chips having passed through the sliding contact portion, and an amount of chips having passed through the sliding contact portion were checked. Results are shown in Table 2.

TABLE 2

| Number of reciprocations | Example 1 | | Example 2 | | Example 3 | | Comparative Example 1 | |
|---|---|---|---|---|---|---|---|---|
|  | Damage | Leakage | Damage | Leakage | Damage | Leakage | Damage | Leakage |
| 1000 | Absent | Absent | Absent | Absent | Absent | Absent | Absent | Absent |
| 2000 | Absent | Absent | Absent | Absent | Absent | Absent | Absent | Absent |
| 3000 | Absent | Absent | Absent | Absent | Absent | Absent | Absent | 0.001 g |
| 5000 | Absent | Absent | Absent | Absent | Absent | Absent | Absent | 0.002 g |
| 10000 | Absent | Absent | Absent | Absent | Absent | Absent | Upper crack | 0.012 g |
| 20000 | Absent | Absent | Absent | Absent | Absent | Absent | — | — |

(3) Evaluation of Presence/Absence of Staying Chips

With respect to the sealing members 10 for machine tools of Examples 1 to 3 after being subjected to the sliding test, the test having been conducted for 20000 times of reciprocation in the above (2), presence/absence of staying chips in the vicinity of the edge portion of the elastic member 12 was observed.

As a result, in Example 1, a large volume of chips staying (a large mass of chips) in the vicinity of the edge portion was observed, in Example 2, a small volume of chips staying (a small mass of chips) in the vicinity of the edge portion was observed, and in Example 3, chips were barely found in the vicinity of the edge portion.

From the above results, it was clearly found that the sealing member for machine tools of the present invention enables contradictory performance to be obtained, that is, the performance of suppressing a slide resistance and ensuring wiper performance in long-time use of the member (when the member is slid repeatedly relative to an opposite material), thereby exhibiting excellent performance as a sealing member for machine tools.

Additionally, forming the side face of the elastic member on the contact part side to be oblique relative to the front face enables suppression of staying chips after use of the sealing member for machine tools.

REFERENCE SIGNS LIST

10, 40: SEALING MEMBER FOR MACHINE TOOLS
11, 41: SUPPORTING MEMBER
11a, 41a: SUPPORTING PORTION
11b: PROTECTIVE PORTION
12, 22, 32, 42: ELASTIC MEMBER
13, 43: ADHESIVE LAYER
15, 45: COVERING MEMBER
41b: PROTECTIVE PORTION (FIRST PROTECTIVE PORTION)
46: SECOND PROTECTIVE PORTION
101, 111: SADDLE
102: LOAD CELL
103, 113: SLIDING BED

The invention claimed is:

1. A wiper member for machine tools comprising:
a supporting member;
a plate-shaped elastic member; and
an adhesive layer which bonds the elastic member to the supporting member, wherein
the supporting member has a shape of a bent plate-like body, and comprises a supporting portion and a first protective portion,
the elastic member is bonded to the supporting portion via the adhesive layer laminated on a part of a front face of the elastic member so as to be curved along the bent shape of the supporting member,
a first corner portion formed by a back face and one side face of the elastic member is assumed to be an edge portion in contact with an opposite material, and the one side face is formed by cutting,
a part of the front face of the elastic member at the side of an edge portion on which the adhesive layer is not laminated is in contact with an inner face of the first protective portion of the supporting member; and
a second protective portion, and the second protective portion is provided at a distal end of the supporting member on a side opposite to the supporting portion.

2. The wiper member for machine tools according to claim 1, wherein an angle formed by the back face and the one side face of the elastic member is an acute angle.

3. The wiper member for machine tools according to claim 1, further comprising a second corner portion formed by the front face and one side face of the elastic member that is chamfered.

4. The wiper member for machine tools according to claim 1, wherein the elastic member is formed from a urethane elastomer.

* * * * *